May 7, 1963 M. L. DRAPER 3,088,151
GREASE BLOTTING DEVICE
Filed July 31, 1962
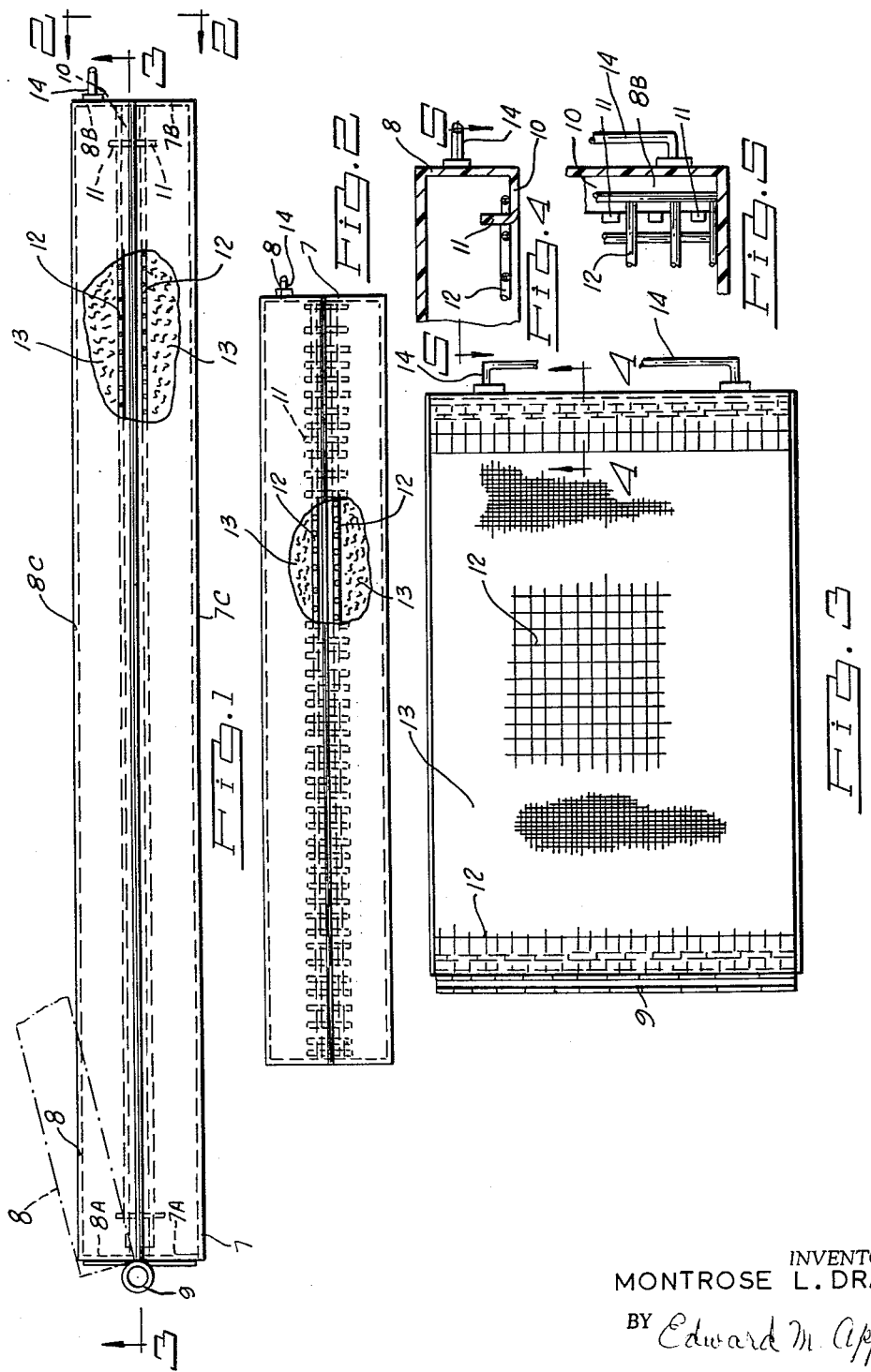
INVENTOR.
MONTROSE L. DRAPER
BY Edward M. Apple
ATTORNEY 3,088,151
GREASE BLOTTING DEVICE
Montrose L. Draper, 12700 Lincoln,
Highland Park, Mich.
Filed July 31, 1962, Ser. No. 213,673
1 Claim. (Cl. 15—210)

This invention relates to restaurant equipment and has particular reference to a device for blotting or absorbing excess grease rendered from the frying or broiling of large quantities of hamburger, sausage, bacon, ham and the like.

In the restaurant business, particularly in the so-called short order restaurants, it is customary to remove the excess grease from the items indicated above by laying them on a folded apron, towel or the like. This is objectionable because of the sanitation problems involved, and because it is not appetizing to look at, inasmuch as the cloth soon becomes smeared with grease and soiled from grimy hands. The practice is also expensive as the aprons or towels must be laundered often.

In other restaurants no attempt is made to dispose of the excess grease and the food is served with the grease dripping and oozing from the meat, all of which is unhealthful and unappetizing.

It is therefore an object of this invention to obviate the foregoing difficulties and to provide a device which is simple in construction, economical to manufacture, efficient in operation and highly sanitary.

Another object of the invention is to provide a device for blotting grease which is provided with pads of inexpensive material which may be disposed of by burning or the like when the pads become saturated.

The foregoing and other objects and the advantages of the invention will become more apparent as the description proceeds, reference being made from time to time to the accompanying drawing, forming part of the within disclosure in which drawing:

FIG. 1 is a side elevational view, with parts broken away, of a device embodying the invention.

FIG. 2 is a front elevational view, of the device shown in FIG. 1, with parts broken away, and taken on the line 2—2 of FIG. 1.

FIG. 3 is a reduced view taken substantially on the line 3—3 of FIG. 1.

FIG. 4 is an enlarged detail, in section, taken substantially on the line 4—4 of FIG. 3.

FIG. 5 is a section taken substantially on the line 5—5 of FIG. 4.

Referring now more particularly to the drawing, it will be understood that in the embodiment herein disclosed, the reference characters 7 and 8 indicate respectively the lower and upper sections of the device which are hinged at one end, as at 9, preferably with a piano-type hinge, so that the upper section 8 may be elevated, as shown by the broken lines in FIG. 1, in order that the food products may be interposed between the sections for blotting therefrom the excess grease as hereinafter described. Each section 7 and 8 is preferably made of stainless steel or other non-corrosive and non-porous material and is preferably made in the form of a rectangle having inturned end flanges 7A and 7B and 8A and 8B, each of which has a rebent portion 10, which terminates in a plurality of inturned fingers 11 formed thereon. The fingers 11 of each section 7-8 are arranged to receive the mesh of a flexible plastic screen 12, which stretches across each section 7 and 8 and is coextensive therewith. The screen of each section serves as a flexible wall for that section and retains in position an absorbent pad 13 which is interposed between each screen 12 and the rectangular walls 7C and 8C of the respective sections 7 and 8. The pads 13 are preferably made of an inexpensive, highly absorbent material so that they may be disposed of economically when saturated. The screens 12 are highly flexible so that they and the pads 13 may readily adapt to the contours of sausage, hamburgers or other food products placed therein for blotting.

The upper section 8 is preferably provided with a finger grip 14 so that it may easily be elevated as shown by the broken lines in FIG. 1 for the insertion of the food products between the padded sections 7-8 for blotting.

It is believed that the operation of the device is obvious from the foregoing description.

Having described my invention, what I claim and desire to secure by Letters Patent is:

A device of the character described, comprising a matched pair of sections, each said section being made of non-corrosive material, and provided with a disposable pad of inexpensive, highly absorbent material and means to secure each pad to its section, the securing means for each said pad including a highly flexible screen which stretches from end to end of its section and is superimposed on the exposed face of said pad and is held against displacement by inturned elements formed on its said section.

References Cited in the file of this patent
UNITED STATES PATENTS

| | | |
|---|---|---|
| 487,446 | Murphy | Dec. 6, 1892 |
| 1,951,079 | Zihlman | Mar. 13, 1934 |
| 2,139,537 | Bassin | Dec. 6, 1938 |
| 2,648,858 | Paull | Aug. 18, 1953 |
| 2,819,484 | Fouse | Jan. 14, 1958 |
| 2,885,703 | Elliott | May 12, 1959 |

FOREIGN PATENTS

| | | |
|---|---|---|
| 984,282 | France | Feb. 21, 1951 |